(No Model.) 2 Sheets—Sheet 1.

J. W. CANTY.
ATTACHMENT FOR MINING CAGES.

No. 472,159. Patented Apr. 5, 1892.

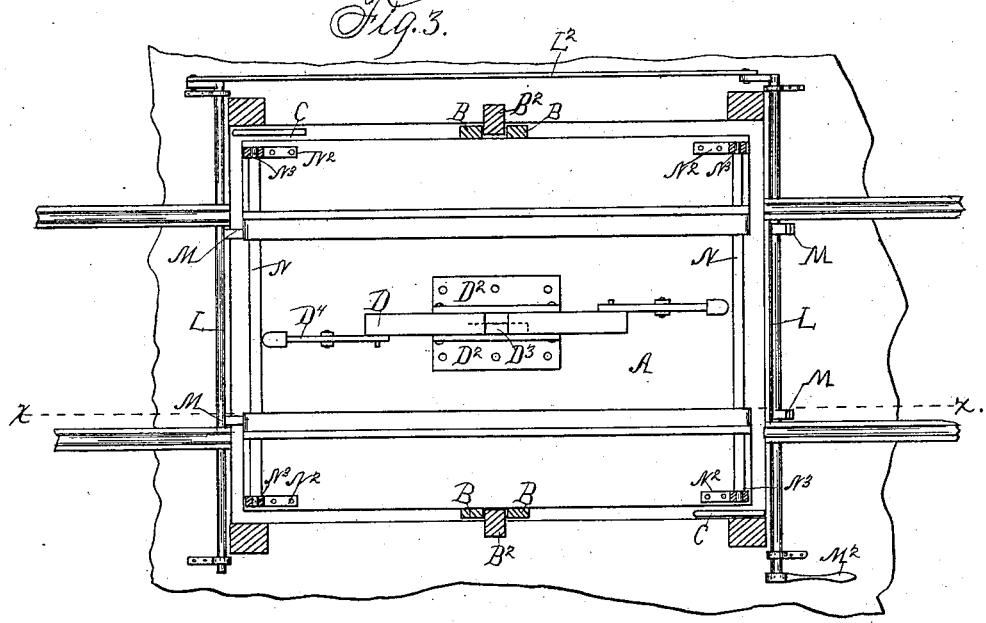
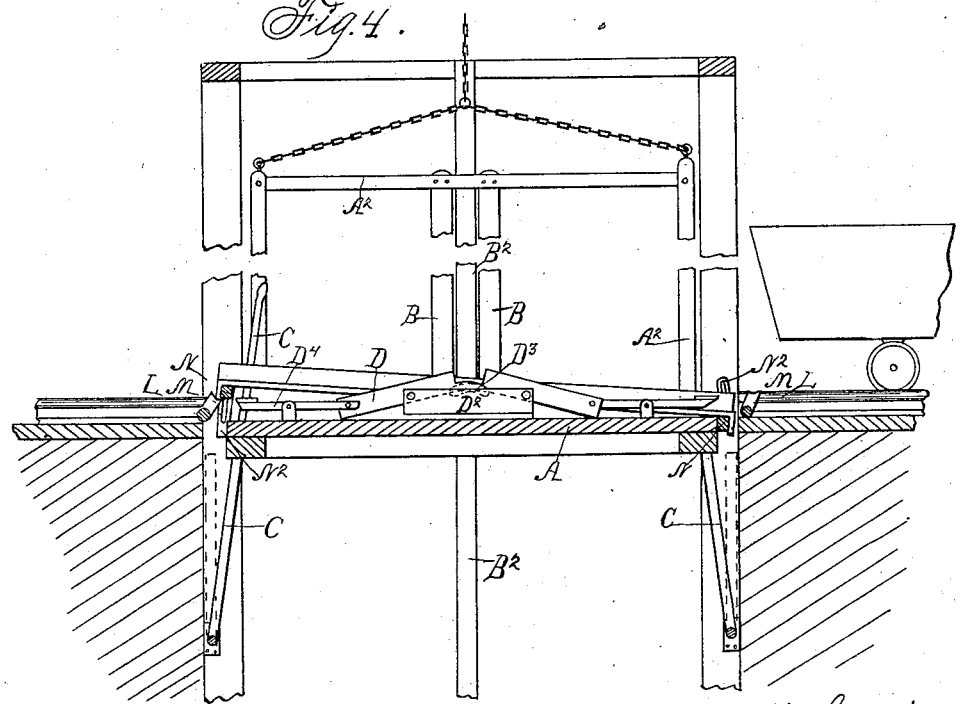

UNITED STATES PATENT OFFICE.

JOHN W. CANTY, OF YOUNGSTOWN, IOWA.

ATTACHMENT FOR MINING-CAGES.

SPECIFICATION forming part of Letters Patent No. 472,159, dated April 5, 1892.

Application filed November 7, 1891. Serial No. 411,233. (No model.)

*To all whom it may concern:*

Be it known that I, JOHN W. CANTY, a citizen of the United States of America, residing at Youngstown, in the county of Polk and State of Iowa, have invented a new and useful Automatic Car-Holding and Car-Moving Attachment for Mining-Cages, of which the following is a specification.

My object is to provide mechanism for mining-cages whereby the car while being elevated in the shaft may be securely held on the floor of the cage and the car upon reaching the surface is automatically released and moved off the cage in either direction by the manipulation of a single lever.

My invention consists in providing means whereby either end of the track-rail on the cage may be elevated, as required, to move the car from the track and cage; in the construction and application of mechanism adapted to elevate either end of the track by interposing an arm adapted to serve as a prop under the ends of the track, when the cage is elevated above the surface of the ground, to retain one end of the track elevated to produce an inclined plane for moving the car from the cage as the cage returns to the level of the ground, and in certain other features of construction in the complete device, as hereinafter set forth, pointed out in my claims, and illustrated in the accompanying drawings, in which—

Figure 1:
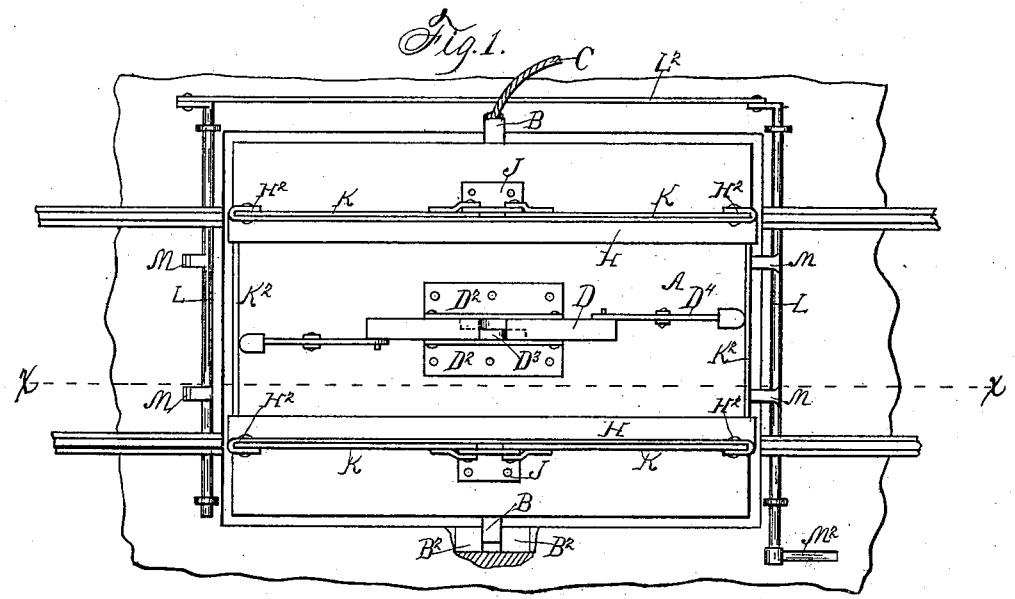
Figure 2:
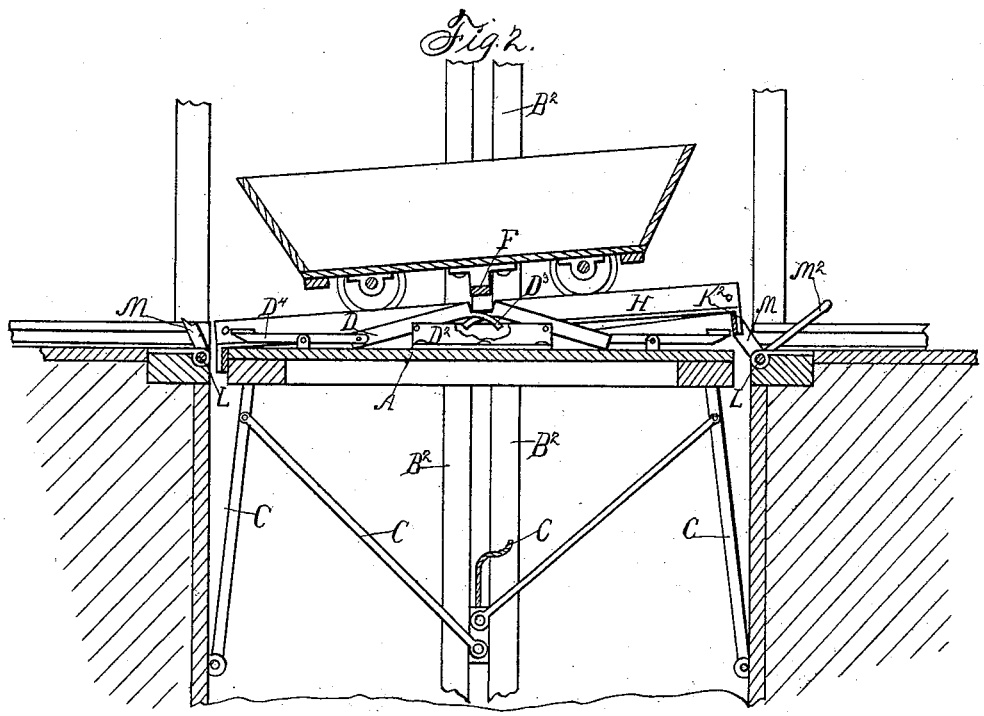

Figure 1 is a top view of the floor of a mining-cage on a level with the top surface of a shaft, showing the car-track and operative parts connected therewith. Fig. 2 is a vertical sectional view through the line $x\ x$ of Fig. 1. Fig. 3 is a top view similar to Fig. 1, showing a modification of the manner in which the track is elevated; and Fig. 4 is a view similar to Fig. 2, having various modifications, hereinafter more specifically pointed out.

The reference-letter A used in the accompanying drawings designates the platform of a mining-cage adapted in size and strength to support a mining-car. It is provided with a frame $A^2$, to the top of which is applied the means for elevating the cage.

At the sides of the cage are the guides B, coacting with projecting pieces $B^2$, fixed to the sides of the shaft, as required, to prevent lateral movements of the cage while being elevated and lowered.

C is an automatic device for preventing the accidental descent of the cage after it has reached the surface of the ground. It is composed of a number of arms or props, so arranged and pivoted to the side of the shaft as to incline inward by gravity and engage the bottom of the cage, and disengaged therefrom either by a lever or a rope extended to the surface of the ground, as shown in Figs. 2 and 4, or in any suitable manner. This device is in common use and constitutes no part of my present invention.

As a means for securely retaining the car in the central portion of the cage during its ascent and descent I employ the following mechanism.

D represents two mating grip-bars pivoted in their approximate centers between the corners of the angle-irons $D^2$, fixed to the central portion of the platform A. Their inner ends are each provided with an integral projection $D^3$, about half the width of the bars, and the said projections extend under the ends of the said bars, so that a movement of either of the bars will operate the other, and a lever $D^4$, fulcrumed to a projection from the top of the platform and pivoted to the outer end of each of the grip-bars, is provided on its outer end with an enlarged portion, as required, to adapt the grip-bars to be operated by a person's foot from either side of the cage.

F represents a downwardly-projecting latch attached to the bottom and central portion of the mining-cars and adapted to be grasped by the said grip-bars, as required, to securely hold the cars in the central portion of the mining-cage.

The normal position of the grip-bars is open and their meeting ends elevated. It will be obvious that a car provided with a downwardly-projecting latch F upon being run on the cage will enter the space between the meeting ends of the grip-bars and at the same time force the ends of the bars downward, and thereby automatically secure the car on the cage.

The track on the cage is so arranged that either end thereof may be elevated, as required, to run the car off the cage in either direction. This may be accomplished in various ways, and I do not wish to limit myself to the particular construction shown in the accompanying drawings. My preferred manner of accomplishing this, however, is shown in Figs. 1 and 2, in which the track is composed of two angle-irons H, having each end of the upright part thereof bent outwardly in the form of a loop $H^2$.

At the center of each angle-iron is a metal plate J, fixed to the edge. It has an upwardly-projecting portion, to each end of which a flat metal bar K is pivoted. The other end of each of the bars is placed in one of the loops $H^2$ and pivotally connected therewith. The ends of the horizontal portion of the angle-iron are bent downward and connected by means of the bar $K^2$, which overlaps the ends of the cage. It will now be obvious that the track-rails thus constructed of angle-irons will be prevented from moving laterally relative to each other, and at the same time have a free vertical movement.

L represents a rock-shaft placed at each end of the opening at the top of the shaft and directly under the rails. They are adapted to be operated isochronously by being connected by the rod $L^2$, which is attached to a crank on the end of each rock-shaft.

Two or more metal arms M, adapted to serve as props, are fixed to each rock-shaft in such a manner that the free ends of the arms on one of the rock-shafts may be placed in proximity to the ends of the mining-cage and those on the other rock-shaft be turned in the opposite direction by means of either of the levers $M^2$, which are fixed to the ends of the rock-shafts, and the top surface of the said arms M are so formed as to admit and hold the bars $K^2$ when placed in contact therewith, and elevate one end of the track on the cage when it is lowered.

Another good manner of providing means whereby either end of the track may be elevated is shown in Figs. 3 and 4 of the drawings, and consists in connecting the rails, which may be angle-irons, if preferred, by means of a metal bar N, which has its outer ends rounded and extended through metal guides $N^2$, which are fixed to the cage outside of the track. The shoulders $N^3$ on the bars N, engaging the sides of the guides $N^2$, prevent lateral movement of the rails.

In practical use in a mining-shaft the device operates as follows: Assuming the cage to be resting on the bottom of the shaft, the car upon being placed thereon will be automatically secured by the clutch device, as hereinbefore set forth, and may then be elevated to the top of the shaft in a common way. Upon reaching the surface it is elevated a short distance above it, and either of the levers $M^2$ may then be operated, as required, to bring either set of the arms or props M directly under the bar $K^2$, and it will be obvious that upon the cage being lowered to the level of the ground that end of the track which is engaged by the props M will remain elevated and the cars run off the cage in the opposite direction. It will also be obvious that when one end of the track and the car are elevated the grip device will be automatically disengaged from the latch on the car.

Having thus described my invention, what I claim as new, and desire to secure by Letters Patent, is—

1. In an automatic car-holding and car-moving attachment for mining-cages, the combination of a track on the floor of the said cage, adapted to be elevated at either end portion, composed of two parallel angle-irons adapted to serve as rails, having the side of each end portion bent outward and backward and the base of each end portion bent downwardly, flat metal bars pivoted between the sides of the angle-irons and the outwardly and rearwardly bent portion of each end thereof and hinged to a plate fixed to the cage at the approximate centers of each of the said rails, the said plates, and flat metal bars fixed between the downwardly-bent portions of the ends of the rails, constructed and applied substantially as set forth.

2. An improved automatic car-holding attachment for moving cages, &c., comprising two angle-plates secured to the approximate center of the floor of the cage, two bars pivoted between the corners of the said plates near their forward ends, each of which bars has a projection extending from its under and outer corners beneath the end of the mating one, thereby leaving an angular opening between the top portion of the said meeting ends, levers with treadles on their outer ends pivoted to a projection from the floor of the cage and to the outer ends of the said bars, and a projection fixed to the under side of a mining-car, adapted to enter the said opening between the ends of the bars and press them downward by gravity when run onto the said cage, substantially as set forth.

3. An improved automatic car-holding and car-moving attachment for mining-cages, comprising a cage of common form, two parallel angle-irons adapted to serve as rails, having the side of each end portion bent outward and backward and the base of each end portion bent downwardly, flat metal bars pivoted between the sides of the angle-irons and the outwardly and rearwardly bent portion of each end thereof and hinged to a plate fixed to the cage at the approximate center of each of the said rails, the said plates, means for engaging either of the flat metal bars at the ends of the track and retaining it elevated when the cage is lowered, two angle-plates secured to the approximate center of the floor of the cage, two bars pivoted between the corners of the said plates near their forward ends, each of which bars has a projection extending from its under and outer corners beneath the end of the mating one, levers with treadles on their outer ends pivoted to projections from the floor of the cage and to the outer ends of the said bars, a projection fixed to the under side of a mining-car, adapted to be inserted between the ends of the said bars and be engaged thereby, and means for automatically engaging the under side of the cage and preventing its accidental descent after it has reached the level of the ground, constructed and combined substantially in the manner set forth, for the purposes stated.

JOHN W. CANTY.

Witnesses:
J. RALPH ORWIG,
THOMAS G. ORWIG.